United States Patent [19]
Solie

[11] 3,898,592
[45] Aug. 5, 1975

[54] ACOUSTIC SURFACE WAVE SIGNAL PROCESSORS

[75] Inventor: Leland P. Solie, Acton, Mass.

[73] Assignee: Sperry Rand Corporation, New York, N.Y.

[22] Filed: May 8, 1974

[21] Appl. No.: 468,126

[52] U.S. Cl. .................... 333/72; 310/8.1; 310/9.8; 333/30 R

[51] Int. Cl. ...... H03h 9/26; H03h 9/30; H03h 9/32

[58] Field of Search .......... 333/30 R, 72, 10; 310/8, 310/8.1, 8.2, 9.8

[56] References Cited

UNITED STATES PATENTS

| | | | |
|---|---|---|---|
| 3,723,916 | 3/1973 | Speiser et al | 333/30 R |
| 3,836,876 | 9/1974 | Marshall et al | 333/30 R |

*Primary Examiner*—James W. Lawrence
*Assistant Examiner*—Marvin Nussbaum
*Attorney, Agent, or Firm*—Howard P. Terry

[57] ABSTRACT

An acoustic surface wave signal processor system finds application in acoustic surface wave multiplexer - demultiplexer apparatus and in acoustic surface wave filters affording selectable frequency and selectable band widths. The signal processor employs a plurality of phase controlling, multiple strip conductor, surface wave couplers placed on a piezoelectric substrate for directing the various frequency bands to spaced-apart tracks on the substrate surface. The signals having thus been separated, the function of demultiplexing is performed; multiplexing may be accomplished by directing the signals through a similar surface wave system, but in the opposite sense. Arrangements for the control of amplifiers in the respective separated channels are used to convert the multiplexer - demultiplexer system into a band pass filter having selectable frequency and band width characteristics.

23 Claims, 16 Drawing Figures

PATENTED AUG 5 1975 3,898,592

ACOUSTIC SURFACE WAVE SIGNAL PROCESSORS

BACKGROUND OF THE INVENTION 1. FIELD OF THE INVENTION

The present invention relates generally to acoustic surface wave signal processors for processing electrical input signals and yielding modified output electrical signals, and more particularly concerns such apparatus for use in multiplexer - demultiplexer or in other communication systems for the control of frequency transfer characteristics.

2. DESCRIPTION OF THE PRIOR ART

Prior art surface wave signal processing systems, which will be discussed in more detail hereinafter, take several forms each having one or more difficulties. One form, in which a wide band and physically long surface wave transducer launches a wave toward an array of physically short, narrow band surface wave receiver transducers, presents high insertion loss, low channel-separation, and unequal output and input impedances. A further known arrangement in which all transducers have the same length presents a reasonable insertion loss, but channel separation is relatively poor and times of wave propagation to the several receiver transducers are undesirably unequal. Parallel connected input transducers may be used with some benefit, but the arrangement has poor insertion loss. Thus, the prior art fails to offer a solution satisfying the four necessary conditions of an acceptable surface wave processor for these applications.

SUMMARY OF THE INVENTION

A preferred form of the invention concerns an acoustic surface wave signal processor for processing and modifying electrical input signals, and particularly concerns such apparatus for use in multiplexer - demultiplexer or in other communication systems. Such acoustic wave signal processors find application in acoustic surface wave multiplexer demultiplexer systems and in acoustic surface wave filters affording selectable frequency and selectable band widths. The signal processor employs a plurality of phase controlling, multiple strip conductor, surface wave couplers placed on a piezoelectric substrate for directing the various frequency bands to discrete tracks on the substrate surface. Having thus been separated, the function of demultiplexing is accomplished; multiplexing is performed by directing signals through a similar system, but in the opposite sense. Arrangements for the control of switches or amplifiers in the respective separated channels are used to permit the multiplexer - demultiplexer system to serve as a band pass filter having selectable frequency and band width. The invention provides an advance over prior art solutions, satisfying the four necessary conditions of an acceptable surface wave processor for these applications, including low insertion loss, good channel separation, equal input and output impedances, and equal propagation times for the several frequency channels.

Figure 6:
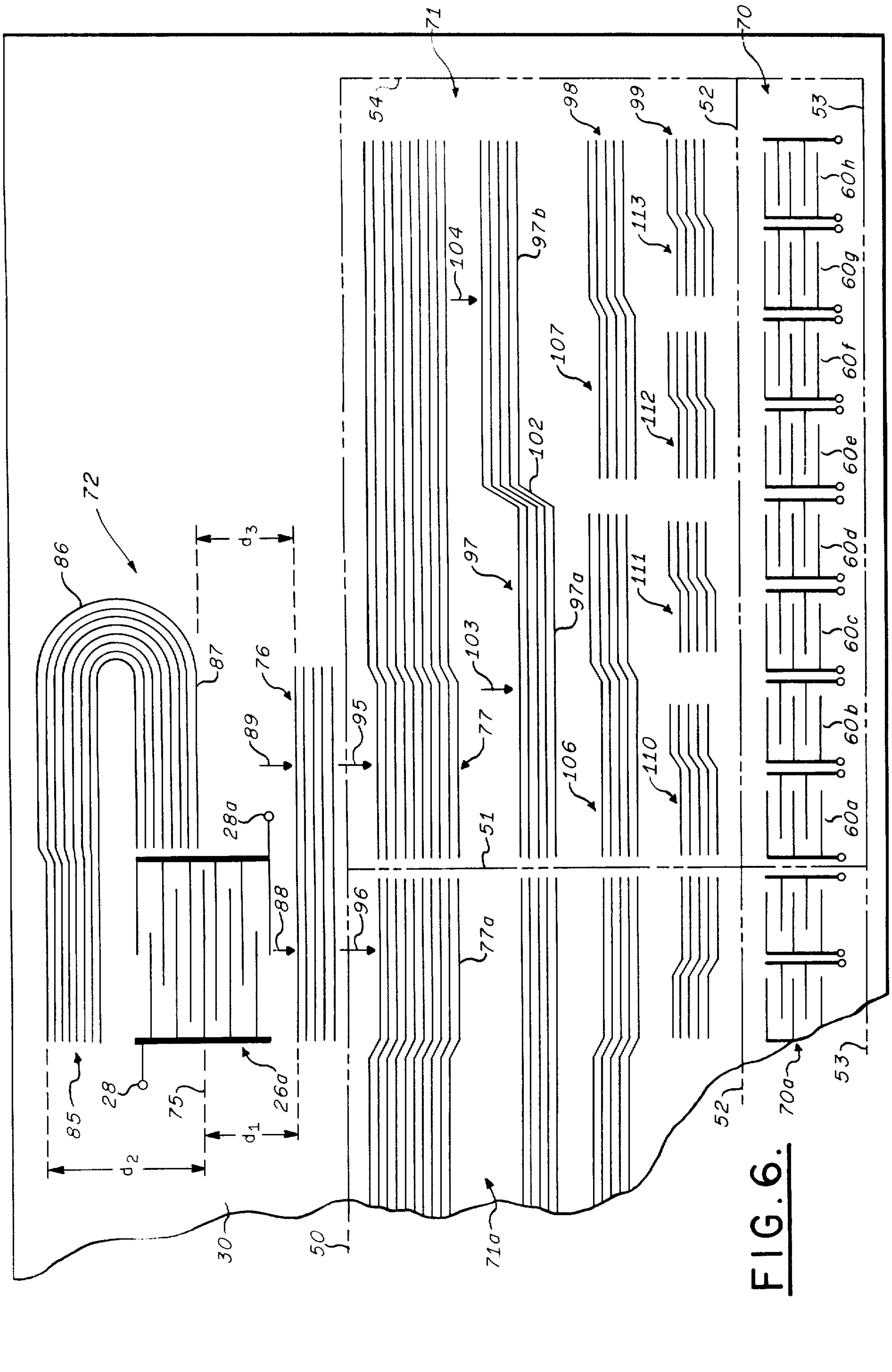
FIG. 6 is a plan view of a multiplexer-demultiplexer system according to the present invention.

FIGS. (9 through 13 are graphs of frequency spectra useful in explaining the operation of the apparatus of FIG. 6.

Figure 14:
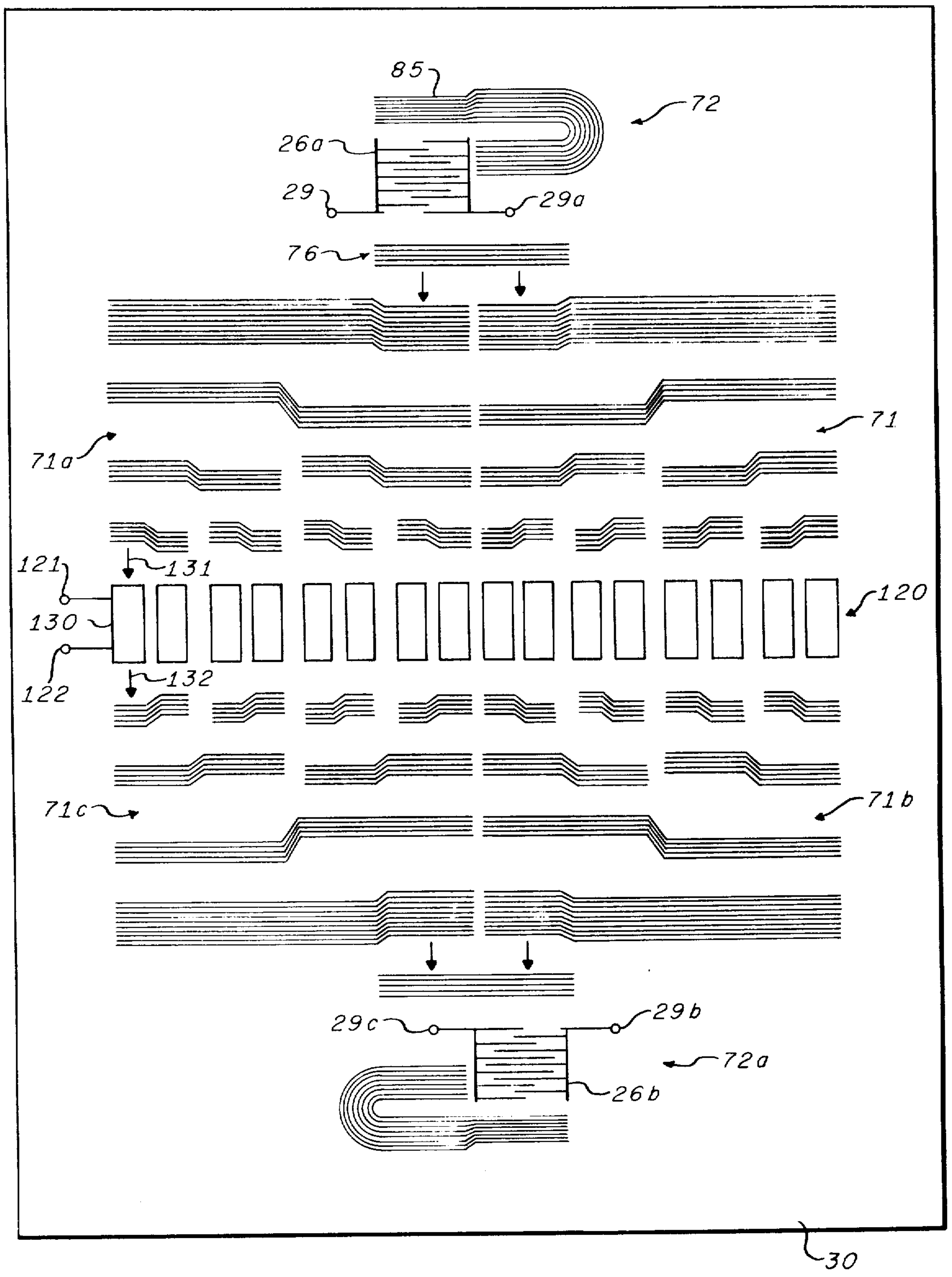

FIG. 14 is a plan view of a controllable filter system embodying the invention.

Figure 15:
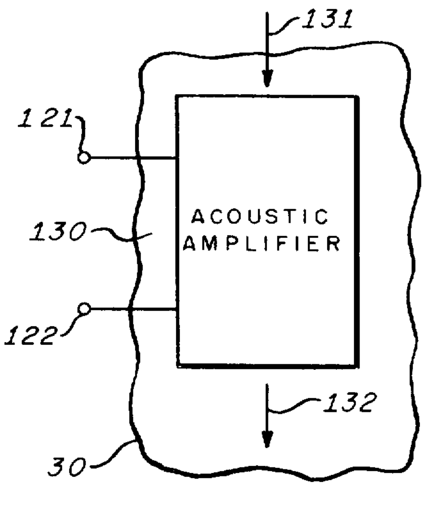
Figure 16:
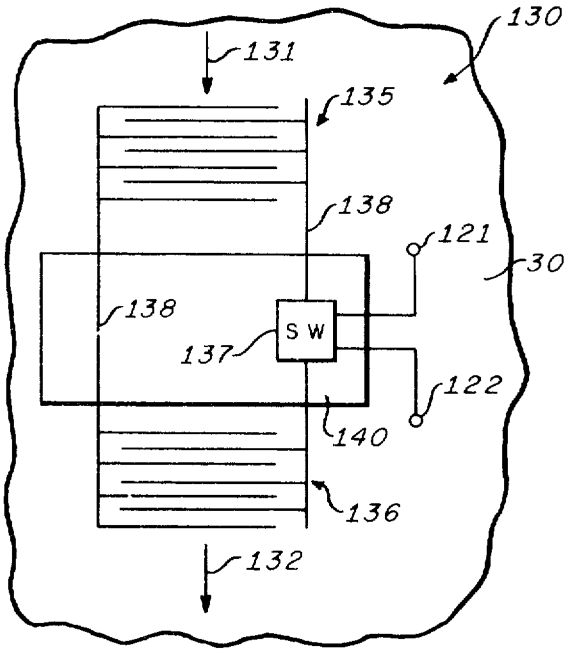

FIGS. 15 and 16 are plan views of control elements useful in the system of FIG. 14.

DESCRIPTION OF THE PREFERRED EMBODIMENTS

Figure 1:
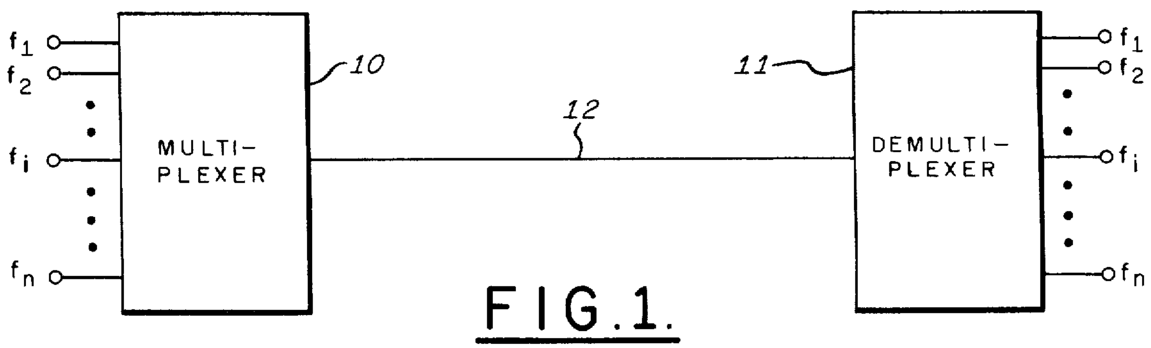
FIG. 1 is a general block diagram of a multiplex communication system.

The invention, which may be embodied for example, in acoustic surface wave frequency multiplexers and demultiplexers and in adjustable filter applications, will first be discussed in relation to a novel surface wave frequency multiplexer-demultiplexer system. As is well known, the function of a frequency multiplexer in a communication channel is to accept several discrete channels of data, each channel having a different frequency band, and to combine the several channels in a single broad band output. On the other hand, a frequency demultiplexer performs exactly the reverse type of operation, accepting on a single input a broad band of usually modulated carrier signals which are then separated by the apparatus into non-overlapping narrow frequency bands, each carrying a discrete channel of data. Thus, the data or information for each frequency band appears at a separate output of the demultiplexer. As seen in FIG. 1, such systems economically reduce the number of transmitting units necessary for transferring plural channels of information.

FIG. 1 illustrates the general structure of an n-channel multiplex communication system comprising a multiplexer 10, a demultiplexer 11, and a single transmission line 12 capable of propagating all frequency bands accepted by the n inputs of multiplexer 10. For example, the information injected into the i'th input port of multiplexer 10 is impressed on a carrier signal $f_i$ to form a signal whose frequency range is centered about frequency $f_i$. The adjacent frequency bands are centered at frequencies $f_{i-i}$ and $f_{i-i}$ and do not overlap the frequency band centered at frequency $f_i$. Thus, the output of multiplexer 10 is substantially the sum of all of the inputs thereto spanning the n narrow band inputs and this output is transferred by the transmission medium 12 to the input of demultiplexer 11, where it is separated into the various output channels according to frequency.

In the multiplex communication system, the elements 10 and 11 are linear devices, operating equally well as multiplexers or as demultiplexers. The reciprocity theorem applies to wave propagation within them, so that it is sufficient for present purposes fully to describe only one of them and, as a matter of convenience, it is elected to describe details of the demultiplexer, especially with respect to FIG. 6.

Figure 2:
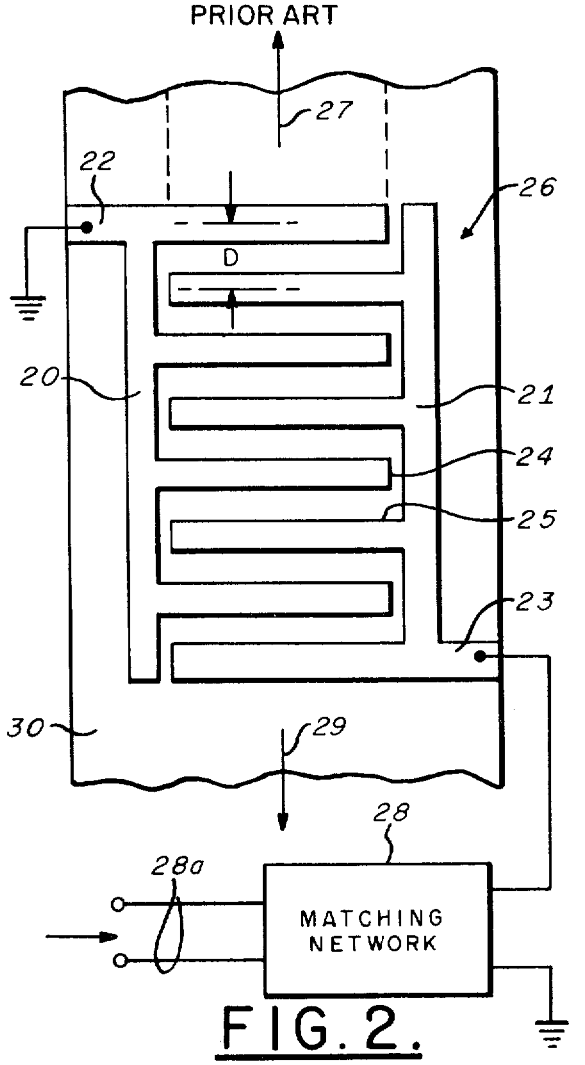
FIG. 2. PRIOR ART
FIG. 2 is a plan view of a typical prior art signal transducer useful in the invention.

A frequency demultiplexer such as that of FIG. 6 will employ surface wave exciting or launching transducer devices kindred to that illustrated in FIG. 2. Removal of the surface wave or receiving it for generating a new electrical wave will be accomplished by similar transducer structures, since the reciprocity theorem is again in force. While several types of surface wave exciter and receiver transducers are available in the prior art, one preferred form of the surface wave excitation means is illustrated in FIG. 2. The device 26 consists of a pair of electrodes 20, 21 with respective interdigital fingers of alternating instantaneous polarity, such as the respective fingers 24, 25. Standard photoetching and photoresist masking or other techniques may be used to fabricate the thin conductors of the interdigital electrodes 20, 21, which electrodes may be made of aluminum or other electrically conducting material, and may have widths of the order of microns. Adjacent fingers of any one electrode, such as fingers 24 of electrode 20, are spaced substantially one wave length apart at the operating carrier frequency. The electrode device 20, 21 acts as an end fire array, propagating the desired forward surface acoustic wave in the direction indicated by arrow 27 when driven by signals which may be passed through a conventional matching network 28 form a signal source (not shown) coupled to leads 28a.

Where generation of an undesired reverse wave as indicated by arrow 29 may not be tolerated, this wave energy may be absorbed in a convenient acoustically matched absorber. For example, an end layer of conventional acoustic absorbing material, such as wax or rubber or dielectric tape may be used. Since the reciprocity theorem evidently applies to the exciter of FIG. 2, a similarly constructed electrode system may act as a surface wave receiver, coupling to the traveling electric field associated with the surface elastic wave, and thereby yielding a useful electrical output for signal processing.

In operation, the exciter electrode system 26 of the transducer of FIG. 2, for example, interacts with the piezoelectric lithium niobate or other substrate 30, producing the two oppositely running surface acoustic waves 27, 29 flowing at right angles to the electrode fingers 24, 25. Adjacent fingers of electrodes 20, 21 are preferably spaced apart by an integral number of half wave lengths. The traveling wave is successively amplified as it passes under each pair of electrode fingers. A receiver electrode system is similarly constituted and operates in the reverse sense to reconvert the acoustic wave into a delayed electrical output signal. In both cases, it is preferred in the interest of efficiency to space the electrode fingers so that the condition of acoustic synchronism obtains, the traveling electric field at the exciter, for example, having the same periodicity as the electric field normally bound to the acoustic wave. For this condition, D in FIG. 2 is one half wave length.

In respect generally to FIGS. 1 and 6, the demultiplexer which is to be specifically examined may be equated to a bank of band pass filters interconnected in some manner. If the out-of-band impedance of each filter of the bank is infinite, the filters can be connected in parallel. On the other hand, if the out-of-band impedance of each filter is zero, the filters may be connected in series. However, filters constructed of interdigital surface wave transmission lines demonstrate capacitive out-of-band impedance. The consequence may be degredation of channel separation, increased insertion loss, or both when such filters are connected together in either manner.

As has been seen with reference to FIG. 2, the interdigital transducer presented therein is a device for converting an electrical signal into a traveling acoustic surface wave. However, it will accomplish this desired result only for a specified frequency range and therefore behaves like a band pass filter. Like other filters, the band pass characteristic of the device may be improved, as by cascading two or more transducers. When dual cascaded filtering is employed, channel separation is desirably increased.

Figure 3:
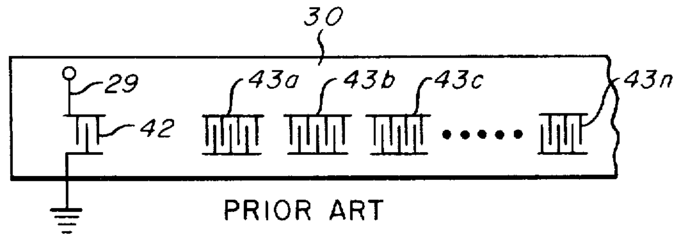
FIG. 3. PRIOR ART
FIGS. 3 through 5 are schematic plan views of prior art surface wave multiplex communication devices.
Figure 4:
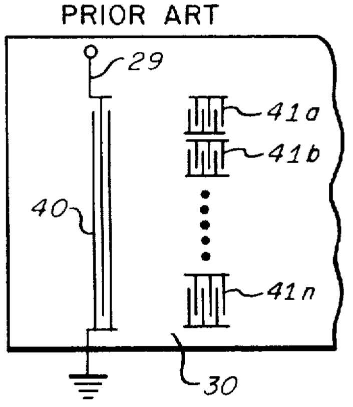

A known technique for surface wave multiplexing (or demultiplexing) is illustrated in FIG. 4; here, a wide band input transducer 40 like that of FIG. 2 projects a surface wave at an array of narrow band transducers 41a through **41*n*, each detecting acoustic wave energy within its predetermined frequency range, allowing the remainder of the energy to pass through the array 41*a* through 41n or to be reflected thereby. The total width of the input transducer 40 is several times the width of each receiver transducer 41*a* through 41*n* and for these and other reasons various deficiencies are present, including high insertion loss, low channel separation, and unequal input and output impedances. A further known surfade wave multiplex device is illustrated in FIG. 3 as employing a wide band input transducer 42 which has the same physical width as each element of the array of narrow band receiver transducers 43*a* through 43*n*. While the input and output impedances may readily be made equal and a reasonable insertion loss is achieved, channel separation is relatively poor and the time delays of the various channels in which receiver transducers 43*a* through 43*n*** operate are undesirably unequal.

Figure 5:
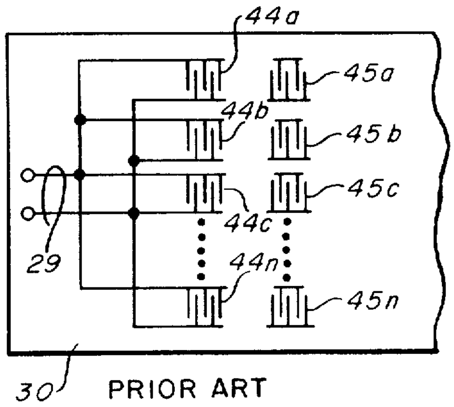

A third prior art multiplexer arrangement is illustrated in FIG. 5, wherein an array of parallel connected input transducers **44*a* through 44*n* is employed, each exciting a track occupied by an associated one of an array 45*a* through 45*n* of receiver transducers. Channel separation, equal input and output, and delay time criteria are met, but the arrangement has the poor insertion loss characteristics of the FIG. 3** arrangement.

Thus, the prior art fails to offer a solution satisfying the four conditions discussed in the foregoing, a result actually achieved by tne novel demultiplexer or multiplexer arrangement of FIG. 6. The input transducer **26*a* in input section 72 is similar in principle to the interdigital transducer of FIG. 2, but its total band width is increased, for instance, due to the use of interdigital fingers of varying lengths according to a known broad banding formula. Ignoring for the moment the surface circuit elements on substrate 30 found in the left lower part of the figure in the area bounded by the imaginary double dot-dash lines 50, 51, 52 and 53, the arrangement of FIG. 6 includes eight output channels in output section 70 for exciting receiver transducers 60*a* through 60*h*, though it will be understood that the number of transducers could be greater or smaller. Signals in the individual non-overlappping frequency channels are detected respectively by each of the eight narrow band transducers 60*a* through 60*h* of section 70**, these transducers acting to provide most of the desired channel separation.

The surface circuit configuration found above the double dot-dash line 52 in FIG. 6 and below the input system section 72, which latter is found above the double dot-dash line 50, will be called herein the director or signal combining or separating section 71, as its purpose is to direct signals of the several channels from input section 72 toward the different output transducers of section 70 according to frequency band. According to a principal feature of the director section 71, the energy within a predetermined frequency channel is directed by the ciricuits of the director section 71 only toward the one output transducer of elements 60*a* through 60*h* that is intended to receive it. Consequently, insertion loss is significantly reduced, since energy is not directed toward output transducers which necessarily must reject the energy as part of their individual filtering processes. On the other hand, the central director section 71 itself performs, as will be seen, a beneficial filtering process by directing the surface wave energy according to its frequency. The filtering actions of the director section 71 and of the output transducer section 70 are, in effect, cascaded, beneficially yielding excellent side lobe suppression. Also, the physical width of input transducer 26*a* may be selected independent of the choice for the physical widths of output transducers 60*a* through 60*h;* thus, input and output impedances may be substantially equal, being determined independent of the physical width factor. Finally, it will be seen by those skilled in the art that all channels have equal wave propagation times and thus cause equal delays.

Figure 7:
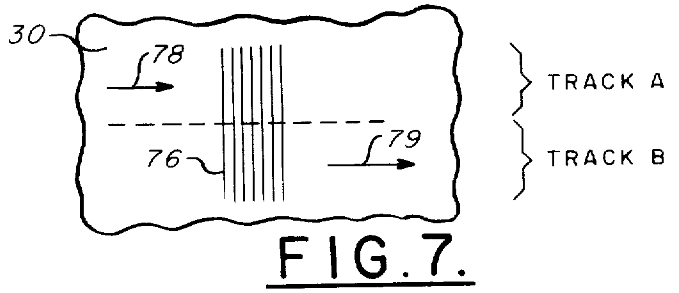
FIGS. 7 and 8 are plan views of couplers employed in the invention and are provided for explanatory purposes.
Figure 8:
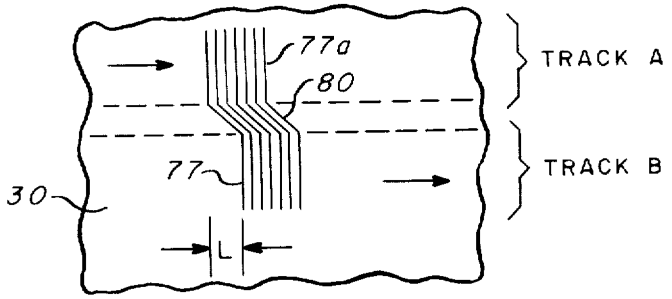

The signal processing events occurring in the director section 71 between the respective input and output transducer sections 72 and 70 are particularly aided by multistrip couplers which have conventionally been recognized as capable of performing certain surface wave operations. In general terms, the operation of the multistrip coupler may be described with reference to FIGS. 7 and 8, by assuming that there are two equal width side-by-side acoustic paths (tracks A and B) on the piezoelectric substrate 30. Intersecting the tracks A and B and parallel to the wave fronts in FIG. 7 is an array 76 of parallel electrically conducting strips deposited on the surface of substrate 30. The center-to-center spacing of the strip conductors is typically slightly less than half of the length of the shortest wave propagating into the structure. If a surface acoustic wave arrives at the multistrip coupler as indicated by arrow 78, a portion of the input energy will be transferred to and emerge in track B as indicated by arrow 79.

The relative portion of acoustic energy transferred from track A to track B in FIG. 7 is a function of the number of strips used in array 76 and the characteristic piezoelectric coupling strength of the piezoelectric substrate material, as will be further discussed. If $N_T$ strips are employed, all of the acoustic energy will be transferred to the opposite track as in FIG. 7, where $N_T$ is a factor dependent upon the selected substrate. For Y-cut, Z-propagation $LiNbO_3$, $N_T$ is about 103. If only $N_T/2$ conductive strips are used, half of the energy is transferred to track B and half remains in track A, yielding a sonic device analogous to a 3 dB. microwave coupler. Since the device of FIG. 7 is both a linear and reciprocal device, it is readily possible to inject waves into both tracks A and B, and to have the energy transfer totally to track A or track B, or to be split in selected proportions between tracks A and B. It is this phenomenon that provides the desired mechanism for directing the surface wave in the multiplexer according to frequency.

Referring more particularly to FIG. 7 and to the 3 dB. coupler case, the acoustic waves flowing outwardly along tracks A and B will be equal in amplitude, but the phase of the wave in track A leads the phase of the wave in track B by 90°. If a reflector were to be placed parallel to array 76 and in both of the two tracks, the signals would reverse in direction, and all of the acoustic energy would flow to the left out of track B. If the phase relation between the leftward flowing waves were reversed, the multistrip coupler 76 would cause all energy to emerge from coupler 76 as a leftward flowing acoustic wave in channel B.

The important consideration is the phase of the surface wave which is transferred into track B of FIG. 7 relative to the phase of the wave not transferred and therefore continuing along track A. If the conducting strips of the coupler 76 are straight as in FIG. 7, the transferred wave leads the second wave by 90°. An additional phase shift may be attained by shifting the positions of the arrays between tracks A and B and rejoining them by conductors as at 80 in FIG. 8. If L is the relative distance the arrays 77 and 77a are shifted, then the signal flowing to the right in track B is shifted by $\pi/2 + 2\pi L/\lambda$, where $\lambda$ is the operating acoustic wave length. Likewise, if acoustic energy enters the multistrip coupler of FIG. 8 from the left as track B, it is retarded in phase by $(2\pi L/\lambda) - \pi/2$. If a straight wave front is incident simultaneously in tracks A and B, track B is a forbidden path and all energy flows out of track A when L is equal to $\pi(n - 1/4)$, where $n = 2,3,4. . .$ Track A is a forbidden path and all energy flows out of track B when L is $\lambda(n + 1/4)$, where $n$ is again 2,3,4. . . Thus, if $V_s$ is the velocity of the surface wave, all of the acoustic energy will emerge from track A of FIG. 8 at a sequence of frequencies $f_n$ given by:

$$f_n = (n - 1/4)\ V_s\ /\ L$$

At frequencies midway between the frequencies $f_n$, all of the energy will emerge from track B. For the frequency separation purpose, it is preferred that $L >> \pi$ and thus the choice of L controls channel spacing.

Referring now to FIG. 6, the input section 72 of the invention includes a surface transducer circuit 26*a*, fed at input leads 28, 28a and generally similar to circuit 26 of FIG. 2 in that circuit 26*a*, though having superior band width, is bidirectional, radiating surface waves of equal phases away from its line of symmetry 75. In one direction, the surface wave represented by arrow 88 propagates a distance $d_1$ before it arrives at the first conductor of a first track of the multistrip coupler 76. The oppositely-flowing equal-energy surface wave generated by transducer circuit 26*a* enters the oppositely disposed multistrip coupler 85. Coupler 85 has $N_t$ strips and, as previously described, transfers all of its energy back toward the second track of the same multistrip coupler 76 as represented by arrow 89. By virtue of the semicircular connections between the respective conductors of the array 85 and of array 87, the conventional system 85, 86, 87 behaves as a known type of reflective track changer. It is to be noted that the line of symmetry 75 of transducer 26*a* and the outer edge of coupler 85 are spaced apart by a distance $d_2$. Also, the proximate edges of arrays 87 and 76 are spaced apart by the distance $d_3$.

Figure 9:
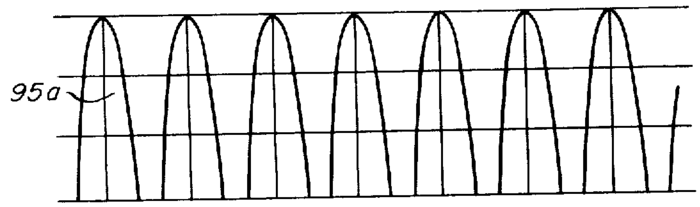
Figure 10:
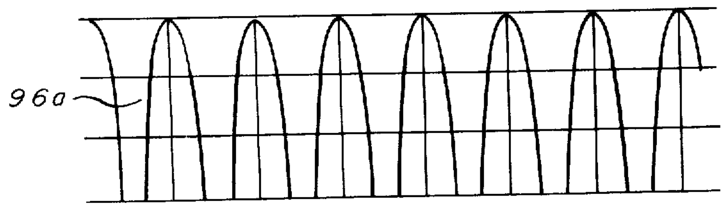

With respect to the track changer 85, 86, 87, the difference between the propagation path lengths of the waves 88, 89 incident upon multistrip coupler 76 is $d_2$ $+d_3-d_1$ The wave traveling the path of length $d_2+d_3$ also undergoes a $\pi/2$ phase shift in passing through the reflective track changer 85, 86, 87. Because of the difference in the paths taken by the waves 88 and 89 incident upon multistrip coupler 76, the left and the right output tracks (on either side of double-dot dash lines 51) of multistrip coupler 76 contain frequency bands separated by $V_s/(d_2 + d_3 - d_1)$ because of the redirection of energy flow with respect to allowed and forbidden paths operating as discussed in the foregoing. The frequency spectrum 95a of the plane wave represented by arrow 95 is shown in FIG. 9, while the plane wave represented by arrow 96 has the spectrum 96a shown in FIG. 10. Spectrum 96a is seen to be shifted in frequency with respect to spectrum 95a by one-half the separation between adjacent signal channels. Where highest separation between bands is desired, wave 96 is not used, its energy being dissipated in a conventional absorber. Returning now to the plane wave 95, this wave enters a parallel disposed conventional beam expander coupler or stepped multiple strip coupler 77 whose function is to increase greatly the width of the beam, by consequence of which the input and output impedances of the system may be independently predetermined.

Figure 11:
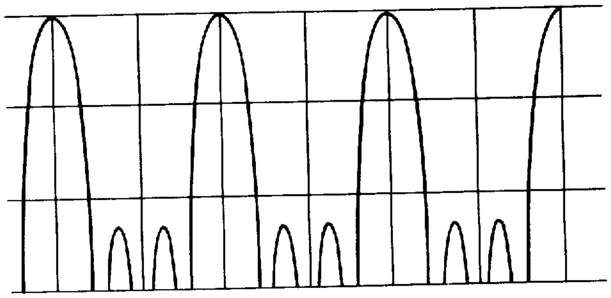

A series of parallel disposed channel separating or stepped multistrip coupler arrays 97, 98, and 99 is encountered by the expanded wave emerging from expander coupler 77. The first of these, channel separating multistrip coupler 97, directly receives the energy emerging from coupler 77 in the form of a plane crested wave. At a symmetrical location in channel separating stepped coupler 97, the parallel conductors are shifted in a conventional manner. The shift between the halves 97a, 97b is designed to provide a phase difference amounting to one half of the phase difference between the waves 88, 89 incident upon coupler 76. Thus, the shift produced by the offset conductors at location 102 is $\frac{1}{2}(d_2 + d_3 - d_1)$. Consequently, of the frequency bands entering the channel separating multistrip coupler 97, every other one is transmitted out of coupler section 97a and the alternate frequency bands are transmitted from coupler section 97b. The effect of the channel separating multistrip coupler 97 is seen in FIG. 11, which shows insertion loss as a function of frequency between input transducer 26a and one of the output tracks associated with the sections 97a, 97b of coupler 97.

Figure 12:
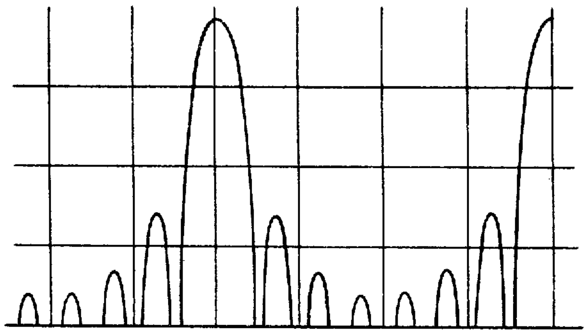

The next succeeding channel separating coupler array 98 includes a pair 106, 107 of off set or stepped multistrip couplers. Coupler 106 receives the output wave of the part 97a of coupler 97 while coupler 107 receives the output wave of the part 97b of coupler 97. The stepped multiple strip couplers 106, 107 again operate in a conventional way to direct alternate frequency bands into alternate tracks. Thus, the spectrum of the signal emanating from coupler array 106 or from array 107 may be represented by FIG. 12.

Figure 13:
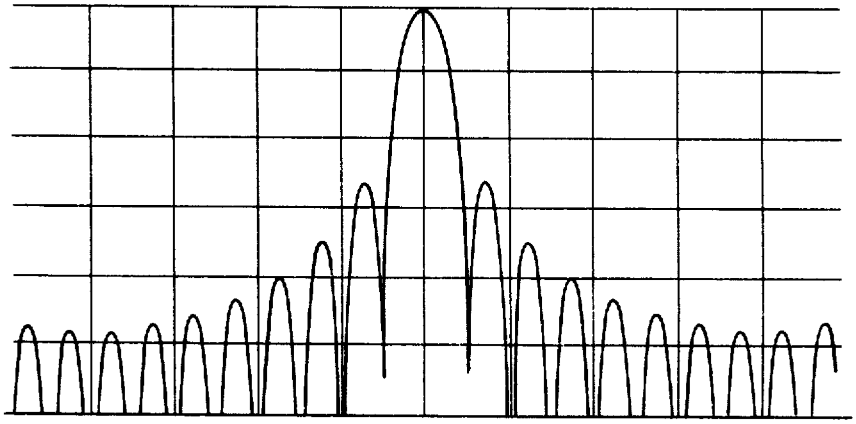

The next succeeding channel separating coupler array 99 includes a quartet 110, 111, 112, 113 of stepped channel separating multistrip couplers. As in the analogous case of the array 98, the coupler 110 receives the output of a first part of coupler 106, while coupler 111 receives the output of the second part of coupler 106, and so on. With the complete array 99 of channel separating couplers 110 through 113 in operation, the spectrum out of a typical channel is shown in FIG. 13. The spectra for other frequency channels is similar, but shifted in frequency by the amount of the channel separation. In FIG. 13, it is indicated that the side lobe level for each channel is reduced to about 13.6 dB before arriving at the array 70 of output transducers. As previously noted, each of the transducers 60a through 60h is made narrow band so as to increase side lobe suppression even farther. For example, transducers may readily be constructed with a side lobe suppression of 30 dB., yielding a desirable total side lobe suppression of 43.6 dB.

It will be understood that the input section 72, director section 71, and output section 70 operate cooperatively to separate the total frequency band of the signal coupled to transducer 26, coupling out of the section at the array of output transducers 60a through 60h. The arrangement thus provides an efficient demultiplexer; furthermore, the number of selected channels may be increased as suggested in FIG. 6 by use of a mirror image circuit configuration placed, for example, on the surface of the same substrate 30. Here, it is seen that demultiplexer action is afforded using the directional wave 96 from transducer 26a director section 71a, and a further output section 70a composed of transducers similar to transducers 60a through 60h. Since all elements of the invention are linear and bidirectional, multiplexer operation may be accomplished using the same apparatus by applying appropriate non-overlapping narrow-band signals to the transducers of array 70, or to both arrays 70 and 70a. In this event, the injected signals are combined and cooperatively exit from the broad band transducer 26a.

It is seen that the invention is successfully employed to channel acoustic energy in plurality of acoustic paths according to signal frequency or, conversely, signals at various separated frequencies are generated in different acoustic tracks and are combined with minimum loss in an output path. The invention may also be used as shown in FIG. 14 for additional purposes. As before, the device of FIG. 14 accepts input signals at one port associated with input section 72 and separates them according to frequency in a director section 71 for recovery at a plurality of output ports. Associated with each of the output ports is one of an array of externally controlled circuit elements 120 adapted selectively to open or close various of the output ports, The individual control circuits of the array 120 individually feed signals to a director configuration 71b, 7c which is a substantial mirror image of director circuits 71, 71a. The signals in those channels of the control circuits 120 which are conductive are combined by the director configuration 71b, 71c into the common output port provided by broad band transducer system 72a. This is accomplished in the same manner as it is done in the device of FIG. 6. The control channels 120 which are conducting effectively determine the pass band of the filter system of FIG. 14 and, because of the several control channels in array 120 can independently be made conducting or non-conducting, the resultant composite filter may demonstrate a variable center frequency and a variable band width. The individual channel band widths of each of the adjacent control circuits are assumed to overlap, in one application, at their 3dB. cross over points. Accordingly, if a pair of adjacent control circuits of band width $\Delta f$ is conducting, the resultant pass band has a width of $2\Delta f$ with no stop band between the channels.

The number of data channels and the band width of each channel can be arbitrarily selected to match various desired design characteristics for the filter. In the sixteen channel selectable filter of FIG. 14, input transducer 26*a* must again have a pass band large enough to accept the total desired frequency spectrum. Since transducer 26*a* is bidirectional, half of the energy coupled by leads 29, 29*a* goes to the reflective track changer 85 and half to the multistrip coupler 76. Track changer 85 also directs the surface wave energy incident upon it to the second half of coupler 76. The energy combines following the aforementioned rules relative to permitted and forbidden paths; channeling of the energy according to frequency is the same as has been described in connection with the multiplexer of FIG. 6.

At the input 121, 122 to the individual control circuit 130 of array 120, the frequency spectrum is the same as that in FIG. 13; the frequency spectrum at the input to each successive control circuit in array 130 is the same as in FIG. 13, except that it is translated in frequency, each successive channel passing a successive frequency band. Signals emanating from the control circuits are propagated by director circuits 71*b*, 71*c* for combination, as described previously, in the broad band output section 72*a*.

As seen in FIG. 15, the representative control circuit may take the form of a conventional surface acoustic wave amplifier operating, for example, as a controllable acoustic attenuator and being controlled by electrical signals applied at terminals 121, 122 which may project through the substrate 30. In the simple case, such switchable attenuators receive the wave 131 for each frequency channel and are externally switched either to pass the output acoustic signal 132 or attenuate it severely. Amplifiers of this type appear in patents and in the other technical literature and may, by way of example, take the general form shown in the L.P. Solie U.S. patent application Ser. No. 408,694 for an "Acoustic Surface Wave Convolver with Bidirectional Amplification," filed Oct. 23, 1973, issued as U.S. Pat. No. 3,833,867 on Sept. 3, 1974, and assigned to the Sperry Rand Corporation.

Alternatively, the control circuits 130 in the control array 120 may take other forms, including that shown in FIG. 16. The acoustic wave 131 may be coupled to an interdigital line 135 coupled, in turn, by conductors 138 through a conventional semiconductor switch 137 to an output interdigital line section 136 for regenerating the output acoustic wave 132. The two interdigital lines 135, 136 are isolated by a conventional acoustic wave isolator 140 formed of a layer of material distinct from that of the substrate 30. Thus, all energy received in acoustic form must pass as an electrical signal through switch 137. In this arrangement, the phase bands of lines 135, 136 may be designed beneficially also to contribute to reduce side lobe levels in each channel, as in excess of 50 dB.

Accordingly, it is seen that the invention is an acoustic surface wave signal processor for processing and modifying electrical input signals, and that it particularly concerns apparatus as may be used beneficially in multiplexer - demultiplexer systems and in other communication systems. Such acoustic wave signal processors find particular application in acoustic surface wave multiplexer - demultiplexer systems and in acoustic surface wave filters for affording selectable frequency and selectable band widths. The novel signal processor employs a plurality of phase controlling, multiple strip conductor, surface wave couplers placed on a piezoelectric substrate for directing the various frequency bands to discrete tracks on the substrate surface. Having thus been separated, the function of demultiplexing is accomplished; multiplexing may be performed by directing signals through a similar system, but so that they flow in the opposite sense. Arrangements for the control of switches or amplifiers in the respective separated channels permit the multiplexer - demultiplexer system to serve as a band pass filter having selectable frequency and band width. The invention provides a significant advance over prior art solutions, satisfying the four necessary conditions of an acceptable surface wave processor for these applications, including low insertion loss, good channel separation, equal input and output impedances, and equal propagation times for the several frequency channels.

While the invention has been described in its preferred embodiments, it is to be understood that the words which have been used are words of description rather than of limitation and that changes within the purview of the appended claims may be made without departure from the true scope and spirit of the invention in its broader aspects.

I Claim:

1. Signal propagation apparatus for processing acoustic signals flowing as discrete acoustic wave beams having individual frequency bands comprising:

substrate means for propagating said discrete acoustic wave beams along a surface thereof, signal frequency band combining means including a plurality of stepped multiple conductor coupler means responsive to said discrete surface acoustic wave beams for forming a single surface wave acoustic beam of predetermined width, additional stepped multiple conductor coupler means responsive to said single surface wave acoustic beam for substantially decreasing the predetermined width of said beam, lineal multiple conductor coupler means responsive to said decreased width surface wave acoustic beam for generating first and second side-by-side surface acoustic waves, reflecting multiple conductor coupler means for reversing the direction of propagation of said first side-by-side surface acoustic wave, and surface wave acoustic transducer means at said surface for receiving said second and reflected first side-by-side surface acoustic waves for generating a corresponding electrical output.

2. Apparatus as described in claim 1 wherein said signal frequency band combining means includes at least a first stepped multiple conductor coupler means responsive to a pair of said discrete acoustic wave beams.

3. Apparatus as described in claim 2 wherein said signal frequency band combining means includes at least a second stepped multiple conductor coupler means responsive to at least two of said first stepped multiple coupler means.

4. Apparatus as described in claim 3 wherein said signal frequency band combining means includes at least a third stepped multiple conductor means responsive to at least two of said second stepped multiple coupler means.

5. Apparatus as described in claim 4 wherein said additional stepped multiple conductor coupler means is directly responsive at least to said third stepped multiple conductor means.

6. Apparatus as described in claim 1 wherein said substrate means comprises a piezoelectric medium.

7. Apparatus as described in claim 6 wherein said piezoelectric medium comprises lithium niobate.

8. Apparatus as described in claim 1 wherein said plural surface wave transducer means comprises plural spaced electroacoustic means for launching said discrete surface acoustic wave beams in substantially mutually parallel relation.

9. Apparatus as described in claim 1 wherein said discrete acoustic wave beams having individual frequency bands are generated by a plurality of surface wave transducer means at said surface.

10. Apparatus as described in claim 1 wherein said discrete acoustic wave beams having individual frequency bands are generated by acoustic surface wave demultiplexer means.

11. Signal propagation apparatus comprising:

substrate means for propagating acoustic waves at a surface thereof, first surface acoustic wave transducer means at said surface for generating first and second surface acoustic waves, reflecting multiple conductor means for reversing the direction of propagation of said first surface acoustic wave, lineal multiple conductor means for combining said second and reflected first surface acoustic waves for forming a composite surface acoustic wave beam having a plurality of signal frequency bands and a predetermined beam width, stepped multiple conductor coupler means responsive to said composite surface acoustic wave beam for substantially increasing the predetermined width of said beam, and signal frequency band separation means including plurality of additional stepped multiple conductor coupler means responsive to said increased width beam for separating said signal frequency bands and for generating corresponding discrete, nonoverlapping beams.

12. Apparatus as described in claim 11 additionally including surface acoustic wave transducer means responsive to said discrete, non-overlapping beams for generating corresponding electrical outputs.

13. Apparatus as described in claim 11 wherein said signal band frequency separation means comprises a first stepped multiple conductor coupler means responsive to said increased width beam.

14. Apparatus as described in claim 13 additionally including at least a first pair of stepped multiple conductor coupler means responsive to said first stepped multiple conductor coupler means.

15. Apparatus as described in claim 14 additionally including at least a second pair of stepped multiple conductor coupler means, responsive to said first pair of stepped multiple conductor means for producing said discrete, non-overlapping beams.

16. Apparatus as described in claim 11 wherein said substrate means comprises a piezoelectric medium.

17. Apparatus as described in claim 16 wherein said piezoelectric medium comprises lithium niobate.

18. Acoustic wave processor means comprising:

substrate means for propagating acoustic waves on a surface thereof, electrically excitable surface acoustic wave transducer means at said surface for generating first and second side-by-side surface waves, first lineal multiple conductor coupler means for combining said first and second surface acoustic waves for forming a composite surface acoustic wave beam having a plurality of signal frequency bands and a predetermined beam width, stepped multiple conductor coupler means responsive to said composite surface acoustic wave beam for substantially increasing the predetermined width of said beam, signal frequency band separation means including a plurality of additional stepped multiple conductor coupler means responsive to said increased width beam for separating said signal frequency bands into discrete, non-overlapping surface acoustic wave beams, signal frequency band combining means including a second additional plurality of stepped multiple conductor coupler means responsive to said discrete non-overlapping surface acoustic wave beams for forming a single surface wave acoustic beam of predetermined width, second additional stepped multiple conductor coupler means responsive to said single surface wave acoustic beam for substantially decreasing the predetermined width of said beam, second lineal multiple conductor coupler means responsive to said decreased width surface wave acoustic beam for generating third and fourth side-by-side surface acoustic waves, and second surface acoustic wave transducer means at said surface for receiving said third and fourth side-by-side surface acoustic waves for generating a corresponding electrical output.

19. Apparatus as described in claim 18 additionally including energy propagation means interposed between said signal frequency band separation means and said signal frequency band combining means.

20. Apparatus as described in claim 19 additionally including electrical switch means for controlling electromagnetic wave propagation within said energy propagation means.

21. Apparatus as described in claim 20 additionally including means for preventing flow of acoustic wave energy in said substrate surface at said energy propagation means.

22. Apparatus as described in claim 18 additionally including acoustic wave amplifier means inserted between said signal frequency band separation means and said signal frequency band combining means.

23. Apparatus as described in claim 22 wherein said acoustic wave amplifier means may be adjusted to alter acoustic waves passing there through.

* * * * *